Oct. 30, 1956 J. P. RUTH 2,768,881
GAS-CONDITIONING SYSTEM
Filed June 18, 1953 2 Sheets-Sheet 1

INVENTOR.
JOSEPH P. RUTH
BY
ATTORNEY

Oct. 30, 1956    J. P. RUTH    2,768,881
GAS-CONDITIONING SYSTEM
Filed June 18, 1953    2 Sheets-Sheet 2
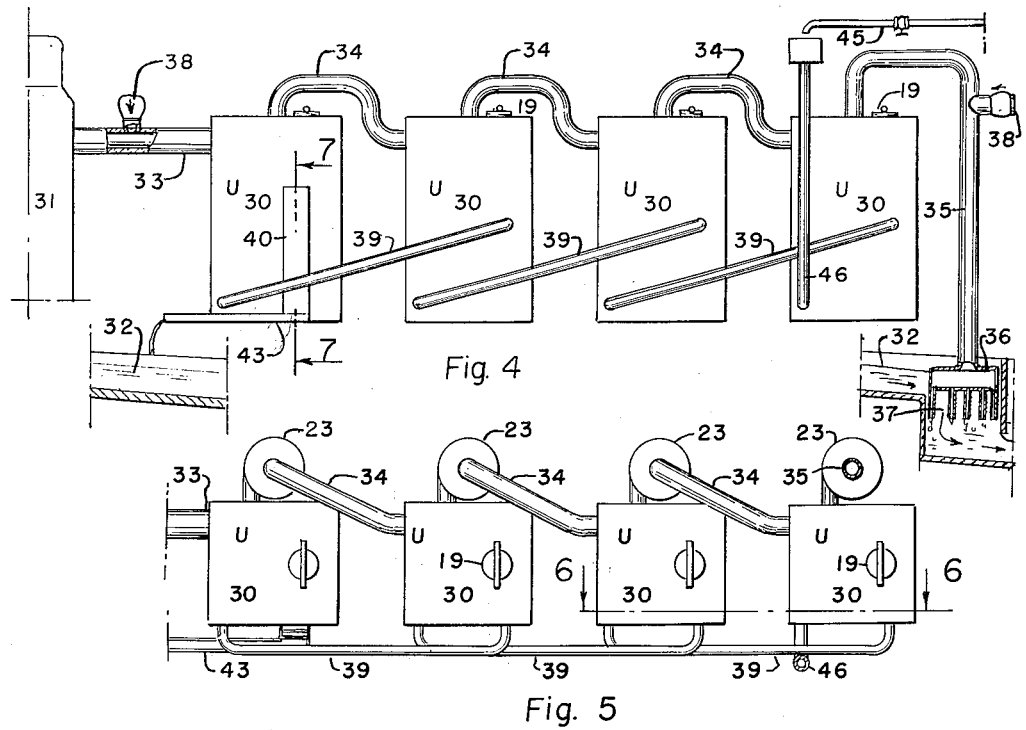
Fig. 4
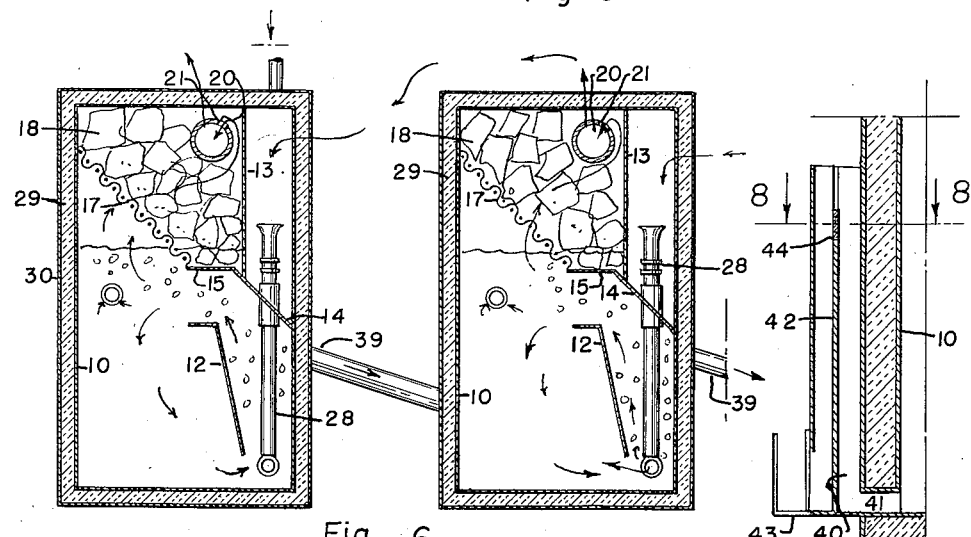
Fig. 5
Fig. 6
Fig. 7
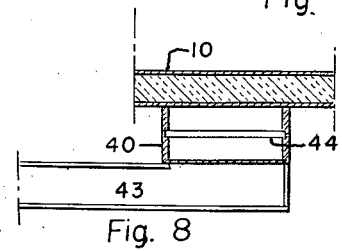
Fig. 8
INVENTOR.
JOSEPH P. RUTH
BY
ATTORNEY.

United States Patent Office 2,768,881
Patented Oct. 30, 1956

2,768,881

GAS-CONDITIONING SYSTEM

Joseph P. Ruth, Denver, Colo.

Application June 18, 1952, Serial No. 294,143

10 Claims. (Cl. 23—284)

This invention relates to the processing of internal combustion engine exhaust gases, and particularly the exhaust gases resulting from operation of diesel-type engines, to modify and suppress the noxious and irritant attributes of such gases and to salvage certain of the gas constituents in form for beneficial use, and has as a principal object to provide improved means, and a novel and improved system comprised from such means, effective as an incident of exhaust gas circulation therethrough under the influence of the gas output pressure to accomplish the purposes above set forth.

The present invention is a development from, a continuation-in-part of and an improvement and novel adaptation of the exhaust gas conditioning method and apparatus disclosed in my application for Letters Patent of the United States, filed January 16, 1950, Serial No. 138,801, now Patent No. 2,611,680, and in an extension of the teachings of said earlier application the present invention recognizes the significance of operating temperatures as affecting the efficiency of the method and apparatus disclosed in said earlier application, provides for conservation of the initially high exhaust gas temperatures within the conditioning apparatus for the maintenance of high operating efficiency, and establishes a system wherethrough the previously-disclosed method and apparatus is effectively applied for salvage of exhaust gas constituents segregated as a consequence of the conditioning operation. Hence a further object of the invention is to provide means for establishing and maintaining efficient operating temperatures in conditioning apparatus of the character disclosed in the above-noted earlier application.

With the foregoing and other objects in view, my invention consists in the construction, arrangement, and combination of elements as hereinafter set forth, pointed out in my claims, and illustrated by the accompanying drawings, in which—

Figure 4 is a somewhat diagrammatic, elevational view of a multi-unit system as typically organized to give effect to certain principles of the invention, portions of the view being in section to illustrate otherwise concealed construction and elements being broken away to conserve space.

Figure 5 is a top plan view of the organization according to Figure 4, some of the elements of the latter view being omitted.

Figure 6 is a fragmentary, detail section, on a relatively enlarged scale, taken substantially on the indicated line 6—6 of Figure 5.

Figure 7 is a fragmentary, detail section, on a further enlarged scale, taken substantially on the indicated line 7—7 of Figure 4.

Figure 8 is a fragmentary, detail section taken substantially on the indicated line 8—8 of Figure 7.

Figure 1:
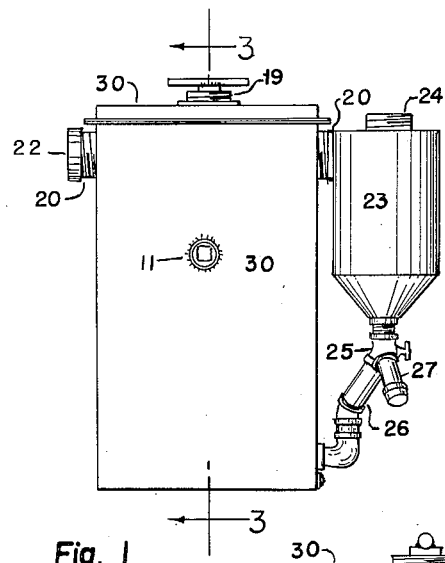
Figure 1 is a side elevation of an exhaust gas conditioning unit of the type disclosed in my earlier application as modified in accordance with the principles of the instant invention.

As represented by the drawings, a unit appropriate for the treatment of internal combustion engine exhaust gases to accomplish the purposes of the invention and the same, except for a complement hereinafter elaborated, as the conditioning unit disclosed in my earlier application is typified by a hollow, generally-rectangular housing 10, imperforate save as hereinafter specified, and the elements associated therewith. The lower portion of the housing 10 functions as a container for a body of water conveniently charged thereinto through, and to a depth determined by, an opening through the container side wall normally closed by a threaded plug 11, and a baffle 12 longitudinally of the housing lower portion upstands at an inclination to the vertical with its lower margin spaced upwardly from and to parallel the housing bottom and its upper margin below the level determined by the plug 11 to divide the water-containing housing lower portion into an upwardly-divergent, lesser compartment communicating above and below the baffle 12 with an upwardly-convergent compartment of relatively greater capacity. Above said upwardly-divergent, lesser compartment a partition 13 closes longitudinally against the housing top and end walls and depends in spaced parallelism with the adjacent housing side wall through and below the level determined by the plug 11 and to sealed engagement of its lower margin with a plate 14 fixed to longitudinally traverse the housing and to outstand at an inclination interiorly and upwardly of the housing from the housing wall forming one side of the said lesser compartment; said plate 14 lying wholly below the level determined by the plug 11, overhanging and slightly constricting the divergent upper end of said lesser compartment, and terminating inwardly of the housing as a horizontal flange 15 overhanging and spaced from the upper margin of the baffle 12 inwardly of the housing from the partition 13. Thus the partition 13 and plate 14 cooperate with elements of the housing 10 to define a chamber within and along an upper side wall of the housing for the reception, expansion and distribution of the gases to be treated; introduction of the gases to said chamber being had through a thimble 16 opening through and adjacent the upper margin of the housing wall closing one side of the chamber. A foraminous or reticulate web 17 closes between the free margin of the flange 15 and the housing wall remote therefrom in an upward inclination laterally of the housing effective to dispose the upper margin of said web above the plug 11 position and to define a compartment in the housing upper portion adapted to contain a charge of broken lime rock 18, or the equivalent, largely above the level determined by said plug; an access opening through the housing top normally closed by a removable plug 19 providing expedient means for introducing and servicing the lime rock charge. Paralleling the partition 13 through the upper corner of the compartment containing the lime rock charge most distant from the web 17, a tubular conduit 20 intersects and opens at each end through the end walls of the housing 10 and is provided throughout its length interiorly of the housing with a longitudinal slot 21 wherethrough communication is established between the upper zone of the housing interior and the interior of the conduit. Exteriorly of the housing, the conduit 20 is closed at one end by means of a removable cap 22, thus to facilitate cleaning of the conduit and its slot 21, and at its other end said conduit engages with and for delivery within a centrifuge 23, of any appropriate type and construction, adapted to exhaust treated gases through an outlet 24 and to pass condensate and entrained matter separated from the gases within the centrifuge through a valved outlet 25 and a return line 26 to a lower zone of the housing 10 interior, or, alternatively, to waste or other disposition through a branch line 27. Operatively completing the conditioning unit, a plurality of spacedly-parallel tubes 28 intersect the plate 14 in a number and size productive of appropriate flow capacity, each of said tubes 28 spacedly paralleling the adjacent housing 10 to side wall and extending from a belled intake mouth within the gas-receiving chamber above the plate 14 to a delivery end adjacent the housing 10 bottom and within the lower end of the upwardly-divergent compartment define between the baffle 12 and said housing side wall.

The housing 10 being charged with water to the level determined by the plug 11, a charge of broken lime rock being present to fill the compartment of the housing above the web 17, the cap 22 and plugs 11 and 19 being applied to close their associated openings, and the line carrying the gas to be treated being coupled to and for delivery of its gas flow to the unit through the thimble 19, the unit functions in reaction to the flow pressure of the gas to reduce the temperature and to modify and eliminate the irritant and obnoxious attributes thereof through circulation-inducing uprise of the gas from the delivery ends of the tubes 28 through the water charge portion filling the lesser, upwardly-divergent compartment at one side of the baffle 12, diffusion of the gas and entrained water vapor and spray through the lime rock charge with consequent wetting and washing effect upon the lime rock as well as chemical modification of the aldehyde and other constituents of the gas, and ultimate exhaustion of the gas through the centrifuge 23 wherein elimination of water vapors and suspended matter is substantially accomplished, all as and in the manner more fully elaborated in my earlier application.

It has been determined that the effectiveness of the conditioning unit shown and described in suppressing and removing irritant and obnoxious properties of the gas, and particularly in effecting water solutions of the aldehydes, is a function of the temperature of the water body through which the gas is circulated and the consequent water vapor output incident to such circulation, water body temperatures below 160° F. being apparently incapable of accomplishing the desired saturation and cleansing of the gas while temperatures above the value stated result in purification of the gas to an extent fully conditioning it for discharge within confined spaces without harmful effect. Further, practical use of the conditioning unit has established that when the volume of the water charge within the unit is properly proportioned to the gas input thereto so as to obviate boiling of the water, excessive ebullition, and consequent premature exhaustion thereof, the operating temperature of the water charge normally does not reach, and seldom exceeds 160° F., hence a feature of the instant invention is conservation of the heat of the gas incoming to the unit water charge in a manner to maintain said charge at or above the minimum effective operating temperature, even when the volume of the water charge is large in proportion to the gas input.

Manifestly, various known expedients may be availed of to establish and maintain a temperature of at least 160° F. in the water charge of the housing 10 during operation of the conditioning unit, but since the temperature of internal combustion engine exhaust gases is usually adequate to accomplish the desired temperature elevation of the water charge wherethrough the gases pass in traversing the unit, and fails to maintain the desired water charge temperature largely because of the heat losses due to radiation from the unit, conservation of the heat input to the unit and applied therein to elevation of the water charge temperature may be simply and practically had by means of a cover or blanket 29 of insulating material enclosing the housing 10 and overlying the top, bottom, side and end walls thereof save for the inlet, outlet, and access openings affording communication with the housing interior as above set forth. The insulating blanket 29 may be constituted from any appropriate material having a low coefficient of heat conductivity and may be associated with and applied to cover the housing 10 in any expedient manner, it being obviously desirable that the exterior surfaces of the blanket 29 be protected by a casing 30 of rigid, wear-resistant material, such as sheet metal, when the material comprising said blanket is fibrous, granular, porous, or non-rigid in character. Functioning in accordance with well-known principles, the blanket 29 retards and minimizes radiation of heat from the exterior surfaces of the conditioning unit, thereby to conserve the heat transferred from the gas infeed to the water charge and to maintain the water charge at an elevated temperature conducive to efficient operation of the unit.

Further, it has been determined that the constituents of internal combustion engine exhaust gases extracted therefrom and dissolved within the water charge of the housing 10 during treatment of the gas in its passage through the unit shown and described characterize such water solution as beneficial to and stimulative of plant growth when utilized to irrigate; it appearing that certain of the extracted gas constituents, as modified by the conditioning treatment, evidence in water solution a nitrogenous quality suited for ready assimilation by plants. Hence, internal combustion engines being extensively in use for the operation of irrigation pumps, it is entirely feasible and highly advantageous to treat the exhaust gases from such engines for the recovery and utilization of their growth-stimulating components in the manner and by the means typified by Figures 4-8 of the drawings and hereinbelow described.

Figure 2:
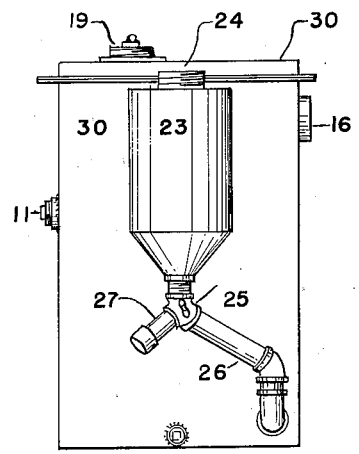
Figure 2 is a side elevation of the organization shown in Figure 1 on a plane at right angles to that of the first view.
Figures 3, 9:
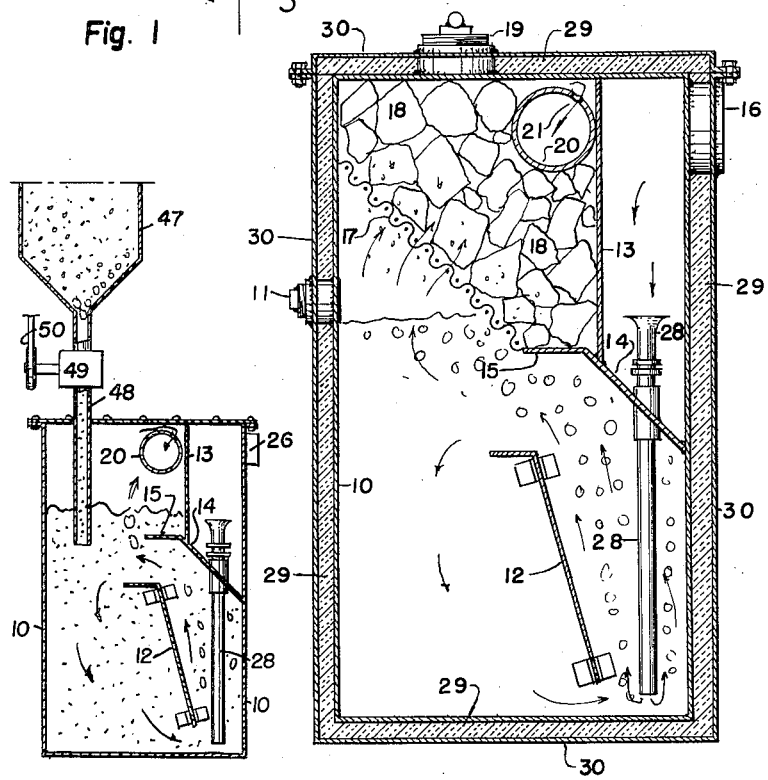
Figure 3 is a vertical section, on an enlarged scale, taken substantially on the indicated line 3—3 of Figure 1.
Figure 9 is a vertical section, similar to Figure 3 and on a relatively reduced scale, illustrating an exhaust gas conditioning unit as further modified within the contemplation of the invention.

In Figure 4 the numeral 31 designates a fragmentarily-illustrated internal combustion engine representing the power unit of a pumping plant, not shown, adapted to provide a flow of irrigating water within and along a sluice, flume, ditch, or the like, indicated at 32, as is wide-spread, conventional practice, the fragmentary illustration of the engine and water flow course typifying generally-fixed installations of plants for the pumping of irrigation water wherewith the conditioning unit above described may be conveniently associated in and as a multi-unit battery for extraction of growth-stimulating components from the engine exhaust gases and feed of the solution characterized by such components to the flow of irrigating water. In the illustrated adaptation of the invention, four like conditioning units U constructed, arranged, charged, and insulated for operation as represented in Figures 1-3 and hereinabove described are aligned in spaced succession with their bases in a common horizontal plane for flow of the exhaust gases from the engine 31 successively therethrough; the exhaust gas flow system consisting of an exhaust gas flow line 33 from the engine delivering to and through the gas intake thimble 16 of the most nearly adjacent unit U, flow conduits 34 connecting the outlets 24 from the centrifuges 23 of the first, second, and third units U with and for delivery through the intake thimbles 16 of the successively-adjacent units, a discharge conduit 35 connecting the outlet 24 from the centrifuge 23 of the fourth unit U with and for delivery within an expansion box or header 36 disposed within the water flow channel 32, multiple jet outlets 37 depending from the box 36 for delivery within the water stream of the flow channel 32, and pressure-reactive valves 38 in the flow line 33 and conduit 35 arranged to open in response to pressures less than atmospheric in said line and conduit for inhibition of suction-induced reverse flow therethrough. With the exhaust gas flow system constituted as shown and described, the exhaust gas output from the engine 31 is caused to successively traverse the series of units U and pass with consequent cooling, purifying, and modifying effect through the water and lime rock charges of the said units to ultimate discharge within the stream of irrigating water where any soluble components remaining in the gas are transferred to the water stream; the principal portion of water-soluble and growth-stimulating components having been previously extracted from the gas and entrapped in the water charges of the units. To pass the concentrations of growth-stimulating gas components with their water of solution from the units U and to the stream of the flow channel 32, and to maintain the water charges of said units at a constant effective level and in condition to continuously extract the water-soluble gas components, said units are inter-connected for a flow of water therebetween in a direction counter to that of the gas flow in reaction to supply of fresh water to the charge of the unit most remote from the engine 31. Facilitative of the maintenance of unit water level and the flow of water through the units, a by-pass 39 connects an opening through the wall of each of the second, third, and fourth units U and communicating with the greater, upwardly-convergent lower portion compartment of the unit just below the level determined by the plug 11 thereof with an opening through the wall of the next-preceding unit communicating with and adjacent the bottom of the lesser, upwardly-divergent compartment of the housing lower portion, thus interconnecting said units below the normal level of their water charges in a manner permitting free transfer of water from one and to another of the units comprised in the battery to consequently maintain a uniform water charge level in the so-connected series of the units. The actual elevation of the uniform water charge level obtaining in the housings of the interconnected units U of a given battery is determined by and is susceptible of regulation through adjustment of a weir-type overflow associated with the unit first to receive the gas delivered through the line 33, a simple construction of such an overflow being illustrated as consisting of an open-top well 40 upstanding in an appropriate length from the base and along an exterior wall of the unit U first receiving the gas output from the engine 31, a channel 41 opening from the bottom of the unit housing to the lower end of said well, a partition 42 longitudinally of the well in spaced parallelism with the adjacent unit exterior wall closing against the well bottom and terminating below the upper end of the well at an elevation below the preferred water charge level of the unit to divide the well into an inner standpipe section and an outer spillway section, an outlet from the lower end of the well spillway section to a trough or launder 43 wherethrough outflow from the well may be directed to ultimate disposition, and a plurality of flashboards 44, or equivalent elements, removably and replaceably end-engaged with slots in the well end walls and in edge registration with the partition 42 to adjustably determine the effective height of the latter, the upper edge of the topmost flashboard 44 in place within the well establishing the actual water charge level in the associated unit, as is well-understood practice. Maintenance of the uniform water charge level within the interconnected units U of the battery at the elevation determined by the flashboard adjustment at the outflow well and development of water charge flow through said units in a direction counter to the gas flow is accomplishd by continuously feeding water from a separate source or supply to the unit U most remote from the gas input to the battery in a volume and at a rate adequate to replace any water losses incident to operation of the battery and to overflow the weir of the well 40, such feed of fresh water to the units of the battery being simply accomplished by means of a valved line 45 leading from any available source or supply of water and delivering to the upper end of a standpipe 46 rising above the maximum elevation of the unit water charge and discharging to and adjacent the bottom of the lesser, upwardly-divergent compartment of the housing lower portion of the said unit U most remote from the gas input to the battery. With the units U of the battery interconnected and arranged for infeed of fresh water in the manner shown and described, the water delivered through the standpipe 46 enters the last of the units in the series at the zone of gas input through the tubes 28 to the water charge of said unit and elevates said water charge above the level of the charge in the next-preceding unit, thus inducing a flow through the by-pass 39 between said units and transferring water from an upper, gas-used zone of the water charge in said last unit to the zone of gas input to the water charge of the next-preceding unit; the consequent elevation of water charge level in the successive units progressing in an obvious manner to introduce relatively fresher water to the gas input zone of each unit water charge and to extract the water more heavily charged with dissolved gas components from the unit until the water of greatest gas component concentration overflows the weir of the well and outflows through the launder 43 whereby it is expediently delivered to the stream of irrigating water moving along the flow channel 32 and is therewith supplied to growing plants. With the organization shown, it is quite feasible to regulate the infeed of fresh water to the battery of gas-conditioning units so as to vary the volume of outflow through the launder 43 and to vary the concentration of dissolved gas components characterizing such outflow, it being manifest that as the rate of fresh water infeed to the battery is increased in relation to a constant rate of gas input the rate of solution outflow from the battery will correspondingly increase and the concentration of dissolved gas components characterizing the outflowing solution will decrease.

Associated for coaction as shown and described, the number and water charge capacities of exteriorly-insulated units U are readily susceptible of correlation to constitute a battery so proportioned to and for the treatment of the exhaust gas output of a given engine as to function in reaction to the gas flow therethrough at an efficient water charge temperature and to effectively saturate the gas with water vapor at each stage of gas diffusion through the lime rock charges of the units, thus to cleanse, purify, and modify the gas to full realization of the purposes of the invention; the infeed of fresh water to the battery and the consequent outflow of solution therefrom adapting the organization for continuous operation through extended time periods without occasion for servicing or maintenance attention.

Operatively equivalent and structurally analogous to the conditioning units U of the preceding discussion, the alternative unit organization represented by Figure 9 is employable, either singly or in multi-unit batteries, with or without an exterior insulating blanket, in substitution for the units typified by Figures 1, 2 and 3. In an organization including the housing 10, baffle 12, partition 13, plate 14, flange 15, thimble 16, conduit 20, and tubes 28, the alternative arrangement according to Figure 9 eliminates the web 17 and broken lime rock charge 18 of the preceding disclosures in favor of a continuous, or continuously-intermittent, feed of alkaline conditioning material directly to and for circulation with the housing liquid charge for reaction with and modification of the gas traversing the unit in the manner and for the effect hereinabove set forth. As shown in Figure 9, the web 17 and broken lime rock charge 18 is omitted from the unit construction of Figure 3 to permit the gases uprising through the housing liquid charge from the lower ends of the tubes 28 to pass directly from the surface of the liquid charge to the conduit 20, and to provide for neutralization of the exhaust gas acid constituents pulverized lime rock, or an equivalent water-insoluble alkali, is delivered from a hopper 47, through a tube 48 sealed through the housing top closure and preferably terminating below the level of the housing liquid charge, to the housing liquid charge at a rate and in a quantity controlled and determined by a feed regulator 49 of suitable conventional type power driven, as at 50, in any appropriate manner. The circulation of liquid obtaining within the housing as a consequence of gas input thereto thoroughly and intimately diffuses the pulverized conditioning material throughout said liquid in a suspension effective for the desired reaction with the gas, and the feeder 49 accommodates appropriate proportioning of the supply of conditioning material to the nature and flow volume of the gas to be treated, thus fully adapting the alternative unit represented by Figure 9 for use in the same manner and in the place of the units U of the system according to Figures 4–8, inclusive.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. An exhaust gas conditioner comprising a closed housing adapted to confine a charge of water in its lower portion, a normally-plugged outflow through a vertical wall of said housing determinative of maximum depth for the housing water charge, a baffle bridging the lower portion of said housing at an inclination to the vertical with the baffle lower margin spaced above the housing floor and the baffle upper margin below the level determined by said outflow, whereby to divide the housing lower portion into an upwardly-divergent lesser compartment and an upwardly-convergent greater compartment intercommunicating both above and below said baffle, a chamber in and isolated from the housing upper portion above said lesser compartment, a lower wall closing said chamber at an upward and inward inclination below the level determined by said outflow and spacedly paralleling the baffle upper margin to define an upwardly and inwardly directed passage therebetween, means for the infeed of exhaust gases to said chamber, flow tubes intersecting the chamber lower wall and terminating in open ends spacedly adjacent the housing floor within said lesser compartment, whereby to apply delivery of exhaust gases under the pressure of their infeed to establish circulation of water and commingled gases upwardly through said passage, a conduit in the housing upper portion separate from said chamber and extending at one end through a housing wall, the wall of said conduit being interrupted within the housing for flow of gases from the housing upper portion through the conduit and thence outwardly from the housing, alkaline material substantially insoluble in water and reactive with the wetted gas in the path of wetted gas flow, between said conduit and the delivery ends of said tubes, and an insulating blanket exteriorly enveloping said housing.

2. An exhaust gas conditioner comprising a closed housing adapted to confine a charge of water in its lower portion, a normally-plugged outflow through a vertical wall of said housing determinative of maximum depth for the housing water charge, a baffle bridging the lower portion of said housing at an inclination to the vertical with the baffle lower margin spaced above the housing floor and the baffle upper margin below the level determined by said outflow, whereby to divide the housing lower portion into an upwardly-divergent lesser compartment and an upwardly-convergent greater compartment intercommunicating both above and below said baffle, a chamber in and isolated from the housing upper portion above said lesser compartment, a lower wall closing said chamber at an upward and inward inclination below the level determined by said outflow and spacedly paralleling the baffle upper margin to define an upwardly and inwardly directed passage therebetween, means for the infeed of exhaust gases to said chamber, flow tubes intersecting the chamber lower wall and terminating in open ends spacedly adjacent the housing floor within said lesser compartment, whereby to apply delivery of exhaust gases under the pressure of their infeed to establish circulation of water and commingled gases upwardly through said passage, a conduit in the housing upper portion separate from said chamber and extending at one end through a housing wall, the wall of said conduit being interrupted within the housing for flow of gases from the housing upper portion through the conduit and thence outwardly from the housing, a hopper adapted to store pulverized alkaline material substantially insoluble in water and reactive with the wetted gas above said housing, a delivery tube from said hopper sealed through the housing top closure and terminating in a lower end below the level determined by said outflow, and a feeder traversed by said tube exteriorly of the housing for regulation of alkaline material delivery therethrough, whereby to maintain such alkaline material in the path of wetted gas flow between said conduit and the delivery ends of said first tubes.

3. A gas-conditioning system comprising a coplanar succession of like closed housings each characterized by a water-charged lower portion, a baffle dividing said lower portion into an upwardly-divergent lesser compartment and an upwardly-convergent greater compartment intercommunicating both above and below the baffle, a chamber in and isolated from said housing above said lesser compartment, means for the infeed of exhaust gases to said chamber, means for the delivery of gases from said chamber to a lower zone of said lesser compartment, a conduit in the housing upper portion separate from said chamber extending at one end through a housing wall and interiorly communicating with the housing interior for discharge of gases from the housing, and alkaline material substantially insoluble in water and reactive with the wetted gas in the path of wetted gas flow between said conduit and the gas delivery zone of the lesser compartment, an exhaust gas supply line delivering to the chamber of the housing first in said succession, a flow line connecting each exterior discharge conduit end of a preceding housing with the chamber of a succeeding housing, and a by-pass line connecting an upper zone of the greater compartment of each succeeding housing with the lower zone of the lesser compartment of the preceding housing, whereby to provide for circulation of water charge through and between said housings in a direction counter to the flow of gas therethrough.

4. A gas-conditioning system comprising a coplanar succession of like closed housings each characterized by a water-charged lower portion, a baffle dividing said lower portion into an upwardly-divergent lesser compartment and an upwardly-convergent greater compartment intercommunicating both above and below the baffle, a chamber in and isolated from said housing above said lesser compartment, means for the infeed of exhaust gases to said chamber, means for the delivery of gases from said chamber to a lower zone of said lesser compartment, a conduit in the housing upper portion separate from said chamber extending at one end through a housing wall and interiorly communicating with the housing interior for discharge of gases from the housing, and alkaline material substantially insoluble in water and reactive with the wetted gas in the path of wetted gas flow between said conduit and the gas delivery zone of the lesser compartment, an exhaust gas supply line delivering to the chamber of the housing first in said succession, a pressure-reactive valve in said supply line inhibitive of suction-induced flow through the line, a flow line connecting each exterior discharge conduit end of a preceding housing with the chamber of a succeeding housing, and a by-pass line connecting an upper zone of the greater compartment of each succeeding housing with the lower zone of the lesser compartment of the preceding housing, whereby to provide for circulation of water charge through and between said housings in a direction counter to the flow of gas therethrough.

5. A gas-conditioning system comprising a coplanar succession of like closed housings each characterized by a water-charged lower portion, a baffle dividing said lower portion into an upwardly divergent lesser compartment and an upwardly-convergent greater compartment intercommunicating both above and below the baffle, a chamber in and isolated from said housing above said lesser compartment, means for the infeed of exhaust gases to said chamber, means for the delivery of gases from said chamber to a lower zone of said lesser compartment, a conduit in the housing upper portion separate from said chamber extending at one end through a housing wall and interiorly communicating with the housing interior for discharge of gases from the housing, and alkaline material substantially insoluble in water and reactive with the wetted gas in the path of wetted gas flow between said conduit and the gas delivery zone of the lesser compartment, an exhaust gas supply line delivering to the chamber of the housing first in said succession, a flow line connecting each exterior discharge conduit end of a preceding housing with the chamber of a succeeding housing, means delivering to the lower zone of the lesser compartment of the housing last in succession for the continuous infeed of fresh water thereto, an exterior overflow column connected with the greater compartment of the housing first in succession and determinative of the water level in said housing, and a by-pass line connecting an upper zone of the greater compartment of each succeeding housing with the lower zone of the lesser compartment of the preceding housing, whereby to provide for circulation of water charge through and between said housings in a direction counter to the flow of gas therethrough.

6. A gas-conditioning system comprising a coplanar succession of like closed housings each characterized by a water-charged lower portion, a baffle dividing said lower portion into an upwardly-divergent lesser compartment and an upwardly-convergent greater compartment intercommunicating both above and below the baffle, a chamber in and isolated from said housing above said lesser compartment, means for the infeed of exhaust gases to said chamber, means for the delivery of gases from said chamber to a lower zone of said lesser compartment, a conduit in the housing upper portion separate from said chamber extending at one end through a housing wall and interiorly communicating with the housing interior for discharge of gases from the housing, and alkaline material substantially insoluble in water and reactive with the wetted gas in the path of wetted gas flow between said conduit and the gas delivery zone of the lesser compartment, an exhaust gas supply line delivering to the chamber of the housing first in said succession, a flow line connecting each exterior discharge conduit end of a preceding housing with the chamber of a succeeding housing, a gas discharge line connected with and for the direction of outflow from the conduit exterior end of the housing last in succession, means delivering to the lower zone of the housing last in succession for the continuous infeed of fresh water thereto, an exterior overflow column connected with the greater compartment of the housing first in succession and determinative of the water level in said housing, a by-pass line connecting an upper zone of the greater compartment of each succeeding housing with the lower zone of the lesser compartment of the preceding housing, whereby to provide for circulation of water charge through and between said housings to discharge through said overflow in a direction counter to the flow of gas through the housings, a channel for the reception and direction of water delivered from said overflow, and a delivery head on said discharge line disposed in and for the output of gas to the water flow along said channel.

7. A gas-conditioning system comprising a coplanar succession of like closed housings each characterized by a water-charged lower portion, a baffle dividing said lower portion into an upwardly-divergent lesser compartment and an upwardly-convergent greater compartment intercommunicating both above and below the baffle, a chamber in and isolated from said housing above said lesser compartment, means for the infeed of exhaust gases to said chamber, means for the delivery of gases from said chamber to a lower zone of said lesser compartment, a conduit in the housing upper portion separate from said chamber extending at one end through a housing wall and interiorly communicating with the housing interior for discharge of gases from the housing, and alkaline material substantially insoluble in water and reactive with the wetted gas in the path of wetted gas flow between said conduit and the gas delivery zone of the lesser compartment, an exhaust gas supply line delivering to the chamber of the housing first in said succession, a flow line connecting each exterior discharge conduit and of a preceding housing with the chamber of a succeeding housing, a gas discharge line connected with and for the direction of outflow from the conduit exterior end of the housing last in succession, means delivering to the lower zone of the housing last in succession for the continuous infeed of fresh water thereto, an exterior overflow column connected with the greater compartment of the housing first in succession and determinative of the water level in said housing, a by-pass line connecting an upper zone of the greater compartment of each succeeding housing with the lower zone of the lesser compartment of the preceding housing, whereby to provide for circulation of water charge through and between said housings to discharge through said overflow in a direction counter to the flow of gas through the housings, a channel for the reception and direction of water delivered from said overflow, and a delivery head on said discharge line disposed in and for the output of gas to the water flow along said channel; together with pressure-reactive valves in said supply line and gas discharge line inhibitive of suction-induced flow therethrough.

8. In a system of the character described, a housing adapted to confine a charge of water in its lower portion, means determinative of maximum depth for the housing water charge, a baffle bridging the housing lower portion with its lower margin spaced above the housing floor and its upper margin below the level determined by said means, whereby to divide said housing lower portion into a lesser compartment and a greater compartment intercommunicating for circulation of water therebetween both above and below the baffle, flow-directing means discharging between said baffle and the more nearly adjacent housing wall upwardly adjacent the housing floor for the infeed of exhaust gases to a lower zone of said lesser compartment, whereby to form a gas-water mixture and to circulate the water charge about the baffle in reaction to the input pressures of the gases, a conduit for the outflow of gases from the housing upper portion, intersticed diffusing material characterized by passages in all directions in the path of wetted gas flow from the water charge and to said conduit, wherein to strip out water entrained with said flow, and alkaline material substantially insoluble in water and reactive with and to neutralize the characteristic acidity of the gas-water mixture in and associated for circulation with the water charge of the housing.

9. In a system of the character described, a housing adapted to confine a charge of water in its lower portion, means determinative of maximum depth for the housing water charge, means for the infeed of exhaust gases to and for delivery upwardly adjacent the housing floor within the water charge of said housing, whereby to form a gas-water mixture and to circulate and agitate the water charge in reaction to the input pressure of the gases, a conduit for the outflow of gases from the housing upper portion, an intersticed member characterized by passages in all directions in the path of wetted gas flow from the water charge and to said conduit, whereby to strip out water entrained with said flow, and solid alkaline material substantially insoluble in water and soluble in and effective to neutralize the characteristic acidity of the gas-water mixture in and associated for circulation with the water charge of the housing.

10. In a gas-conditioning system having a housing adapted to confine a charge of water in its lower portion, an outlet to atmosphere from an upper portion of said housing, and means for the input of internal combustion engine exhaust gases to said housing delivering upwardly adjacent the housing floor within the housing water charge, a valve associated with said input means exteriorly of the housing adapted to open said means to atmosphere in reaction to pressures less than atmospheric obtaining within the input means, whereby to inhibit induction of water from the housing within and through said means.

References Cited in the file of this patent

UNITED STATES PATENTS

| | | |
|---|---|---|
| 1,032,536 | Gerli | July 16, 1912 |
| 1,843,999 | White | Feb. 9, 1932 |
| 1,854,428 | Segerfelt | Apr. 29, 1932 |
| 1,858,637 | McDonald | May 17, 1932 |
| 1,867,325 | Neville | July 12, 1932 |
| 1,891,170 | Nose | Dec. 13, 1932 |
| 1,945,002 | Shoeld | Jan. 30, 1934 |
| 1,950,981 | Glund | Mar. 13, 1934 |
| 2,036,517 | Colman | Apr. 7, 1936 |
| 2,234,057 | Mount | Mar. 4, 1941 |
| 2,458,505 | Denig | Jan. 11, 1949 |
| 2,508,297 | Ruth | May 16, 1950 |
| 2,611,680 | Ruth | Sept. 23, 1952 |

FOREIGN PATENTS

| | | |
|---|---|---|
| 19,665 | Great Britain | 1910 |